(12) United States Patent
Hofer et al.

(10) Patent No.: US 10,644,525 B2
(45) Date of Patent: May 5, 2020

(54) METHOD FOR THE OPERATION OF A BUCK CONVERTER AS A POWER SOURCE FOR THE ELECTRONICS OF A BATTERY SYSTEM AND A BATTERY SYSTEM WITH A BUCK CONVERTER

(71) Applicant: Samsung SDI Co., Ltd., Yongin-si, Gyeonggi-do (KR)

(72) Inventors: Maximilian Hofer, Hartberg (AT); Thomas Korherr, Hartberg (AT)

(73) Assignee: Samsung SDI Co., Ltd., Yongin-si (KR)

( * ) Notice: Subject to any disclaimer, the term of this patent is extended or adjusted under 35 U.S.C. 154(b) by 140 days.

(21) Appl. No.: 15/725,137

(22) Filed: Oct. 4, 2017

(65) Prior Publication Data
US 2018/0123353 A1 May 3, 2018

(30) Foreign Application Priority Data
Oct. 27, 2016 (EP) ..................................... 16196013

(51) Int. Cl.
| | |
|---|---|
| *H02J 7/00* | (2006.01) |
| *G05F 1/648* | (2006.01) |
| *G05F 1/56* | (2006.01) |
| *H02M 3/04* | (2006.01) |
| *H02M 3/00* | (2006.01) |
| *H02J 7/34* | (2006.01) |

(52) U.S. Cl.
CPC ................ *H02J 7/007* (2013.01); *G05F 1/56* (2013.01); *G05F 1/648* (2013.01); *H02M 3/04* (2013.01); *H02J 7/345* (2013.01); *H02M 3/00* (2013.01)

(58) Field of Classification Search
CPC ....................................................... H02J 7/007

USPC ......................................................... 320/129
See application file for complete search history.

(56) References Cited

U.S. PATENT DOCUMENTS

| | | |
|---|---|---|
| 5,089,768 A | 2/1992 | Sato |
| 2003/0042881 A1 | 3/2003 | Lanni |
| 2006/0049816 A1 | 3/2006 | Tan |
| | (Continued) | |

FOREIGN PATENT DOCUMENTS

| | | |
|---|---|---|
| KR | 2001-0000140 A | 1/2001 |
| KR | 10-0844678 B1 | 7/2008 |
| KR | 10-2013-0104149 A | 9/2013 |

OTHER PUBLICATIONS

Partial European Search Report dated Mar. 15, 2017, for corresponding European Patent Application No. 16196013.3, 5pp.
(Continued)

*Primary Examiner* — Edward Tso
*Assistant Examiner* — Ahmed H Omar
(74) *Attorney, Agent, or Firm* — Lewis Roca Rothgerber Christie LLP (57) ABSTRACT

A method for operating a buck converter as a power source for electronics of a battery system, includes: operating the buck converter in a first mode in which the buck converter provides a first output voltage; receiving a first control signal; and in response to receiving the first control signal, operating the buck converter in a second mode in which the buck converter provides a second output voltage for a System Basis Chip of the battery system. The first output voltage has a first value in a range of a to b, and the second output voltage has a second value in the range of c to d, wherein b is less than c.

17 Claims, 3 Drawing Sheets

(56) References Cited

U.S. PATENT DOCUMENTS

2017/0126133 A1* 5/2017 Yang ................. H02M 3/33507
2017/0170734 A1* 6/2017 Sheng ............... H02M 3/33507

OTHER PUBLICATIONS

European Search Report dated May 22, 2017, for corresponding European Patent Application No. 16196013.3, 11pp.
Hormann, Leander B. et al., "Evaluation of Component-Aware Dynamic Voltage Scaling for Mobile Devices and Wireless Sensor Networks", Institute for Technical Informatics, 2011 IEEE, Jun. 20, 2011, 9pp.
Texas Instruments, "Single-Cell Li-Ion Battery-And Power-Management IC," TPS65800, Sep. 1, 2005, 98pp., XP007910112, Internet: URL: http://www.datasheetarchive.com/pdf/Datasheet-015/DS00256564.pdf [retrieved on Oct. 12, 2009].
EPO Office Action dated Mar. 29, 2018, for corresponding European Patent Application No. 16196013.3 (6 pages).

\* cited by examiner

METHOD FOR THE OPERATION OF A BUCK CONVERTER AS A POWER SOURCE FOR THE ELECTRONICS OF A BATTERY SYSTEM AND A BATTERY SYSTEM WITH A BUCK CONVERTER

CROSS-REFERENCE TO RELATED APPLICATION

This patent application claims priority to and the benefit of European Patent Application No. 16196013.3, filed on Oct. 27, 2016, in the European Patent Office, the disclosure of which is incorporated herein by reference in its entirely.

BACKGROUND

1. Field

One or more aspects of example embodiments of the present invention relate to a method for the operation of a buck converter as a power source for the electronics of a battery system.

2. Description of the Related Art

A rechargeable or secondary battery system differs from a primary battery system in that the secondary battery system can be repeatedly charged and discharged, while the primary battery system provides for an irreversible conversion of chemical to electrical energy. Low-capacity rechargeable batteries may be used as a power supply for small electronic devices, such as cellular phones, notebook computers, and camcorders, while high-capacity rechargeable batteries may be used as the power supply for hybrid vehicles and the like.

Recently, many battery systems include a so called System Basis Chip, which is used to support different functionalities of the battery system. Some of these functionalities are directed to the voltage supply for a microcontroller, which is often part of the battery system as well. Usually, different supply voltage levels are provided for the microcontroller of the battery system by the System Basis Chip. For example, such supplied voltage levels may include a 5V AUX voltage, or expressed in other words, a 5V voltage for an AUX-input, a 3.3V IO voltage, and/or a 1.25V core voltage.

Such System Basis Chips usually require a power supply of 12V. As many battery systems provide for higher voltages, for example, for a voltage of $V_{BS}$=48V, a conversion of this higher voltage to the lower voltage (of e.g. 12V) for the power supply of the System Basis Chip may be desired. Usually, such conversion of the voltage may be performed via a so called buck converter, which may have the same converted output voltage (e.g. an input voltage of 48V converted into an output voltage of 12V).

Additionally, complex relay driver circuits, often operable in a pulse-width modulation (PWM), or a so called buck mode, may be used within state of the art battery systems, allowing for the operation of relays, and enabling a safe separation of terminals of the battery system from a load connected to the terminals.

However, the aforementioned converter and circuits, which are integrated within the battery system, may be complex, may include a plurality of components, may consume a lot of energy (thus, are not energy efficient), and may be expensive.

The above information disclosed in this Background section is for enhancement of understanding of the background of the invention, and therefore, it may contain information that does not constitute prior art.

SUMMARY

One or more drawbacks of the related art may be avoided, or at least reduced, according to one or more aspects of example embodiments of the present invention. In particular, according to one or more aspects of example embodiments of the present invention, a method for the operation of a buck converter as a power source for the electronics of a battery system is provided.

According to an example embodiment of the present invention, a method for operating a buck converter as a power source for electronics of a battery system, includes: operating the buck converter in a first mode in which the buck converter provides a first output voltage; receiving a first control signal; and in response to receiving the first control signal, operating the buck converter in a second mode in which the buck converter provides a second output voltage for a System Basis Chip of the battery system. The first output voltage has a first value in a range of a to b, and the second output voltage has a second value in a range of c to d, where b is less than c.

In an embodiment, a may be equal to 6V, b may be equal to 10.5V, c may be equal to 10.8V, and d may be equal to 13.2V.

In an embodiment, the method my further include: receiving a second control signal; and operating the buck converter in a third mode in response to receiving the second control signal. In the third mode of operation, the buck converter may provide a third output voltage for a duration, and the third output voltage may have a third value in a range of e to f, where d is less than e.

In an embodiment, e may be equal to 21.5V and f may be equal to 26.5V.

In an embodiment, the duration may have a value in a range of 90 ms to 110 ms.

In an embodiment, the method may further include: operating the buck converter in the second mode after the duration has lapsed.

In an embodiment, the first output voltage may be generated via a pulse width modulation and/or may have an alternating value.

According to an example embodiment of the present invention, a battery system includes: a plurality of battery cells; a buck converter including: a first input terminal connected to a first potential provided by the plurality of battery cells; a second input terminal connected to a feedback circuit; and an output terminal configured to output an output voltage; and a battery management circuit configured to be connected to the output terminal via a first switch. The feedback circuit includes a second switch connected in series to a first resistor, the second switch being configured to electrically connect the second input terminal to a second potential, and a third switch connected in series to a second resistor, the third switch being configured to electrically connect the second input terminal to the second potential.

In an embodiment, the feedback circuit may further include a fourth switch connected in series to a third resistor, the fourth switch being configured to electrically connect the second input terminal to the second potential.

In an embodiment, the buck converter may further include a third input terminal connected to a timer circuit.

In an embodiment, the timer circuit may be configured to alternatingly open and close the second switch with a frequency, to cause the buck converter to provide an alternating first output voltage, and the first output voltage may have a value in a range of 6V to 10.5V.

In an embodiment, the battery system may further include a transceiver circuit configured to cause, in response to receiving a first control signal, closing of the first, second, and fourth switches, and the buck converter may be configured to output a second output voltage having a range of 10.8V to 13.2V in response to the closing of the first, second, and fourth switches.

In an embodiment, the battery management circuit may be configured to hold, in response to receiving the second output voltage, the first, second, and fourth switches in a closed state.

In an embodiment, the battery system may further include a fifth switch electrically connected to the output terminal of the buck converter, and to a first terminal of a relay, the relay including a second terminal electrically connected to the second potential of the battery system.

In an embodiment, the transceiver circuit may be configured to cause, in response to receiving a second control signal, closing of the first, second, third, fourth, and fifth switches for a duration, and the buck converter may be configured to provide the battery management circuit with a third output voltage having a range of 21.5V to 26.5V in response to the closing of the first, second, third, fourth, and fifth switches.

BRIEF DESCRIPTION OF THE DRAWINGS

The above and other aspects and features of the present invention will become apparent to those skilled in the art from the following detailed description of the example embodiments with reference to the accompanying drawings, in which.

DETAILED DESCRIPTION

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity.

Spatially relative terms, such as "beneath,""below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

According to one or more embodiments, a method of operating a buck converter includes; operating the buck converter in a first mode in which the buck converter provides a first output voltage; receiving a first control signal; and in response to receiving the first control signal, operating the buck converter in a second mode in which the buck converter provides a second output voltage for a System Basis Chip of the battery system. The first output voltage has a first value in a range of a to b (e.g., $V_1 \in [a; b]$), and the second output voltage has a second value in a range of c to d (e.g., $V_2 \in [c; d]$), wherein b is less than c.

In such an embodiment, one single buck converter may be used to operate the System Basis Chip of a battery system with different output voltages. In more detail, the buck converter may be operable in a first mode of operation which represents a Sleep Mode and in a second mode of operation which represents a Normal Mode. In the Sleep Mode, the first output voltage $V_1$ provided by the buck converter may be lower than the second output voltage $V_2$, which is provided by the buck converter in the Normal Mode. Thus, it is not necessary to provide a battery system with two buck converters, as at least two different voltage levels may be provided for the electronics of the battery system by using one single buck converter.

Expressed in other words, one single buck converter may be used to support different components of the battery system, for example, a System Basis Chip and/or a transceiver circuit. The output voltage provided by the buck converter varies in dependence of the state or the mode of operation of the buck converter. This may allow for reduction of the total number of components that are used within the battery system, and may provide for a more cost efficient and energy efficient realization of the power supply of the electronics of the battery system.

The first output voltage $V_1$ may be provided to a transceiver circuit of the battery system. Furthermore, the first output voltage $V_1$ may be provided to a receiver circuit of the battery system.

The first control signal may be received via the receiver circuit or the transceiver circuit connected to a bus system. For example, the first control signal may be received via a Controller Area Network (CAN) transceiver circuit.

According to an embodiment, a=6V, b=10.5V, c=10.8V and d=13.2V. For example, the first output voltage may have a value of $V_1 \in [6V; 10.5V]$. The second output voltage may have a value of $V_2 \in [10.8V; 13.2V]$. Furthermore, the second output voltage may have a value of $V_2 \in [11V; 13V]$. In such an embodiment, the output voltages which are provided by the buck converter in the first and second modes of operation may correspond to the input voltages used by the transceiver circuit and by the System Basis Chip, respectively, allowing for the buck converter to supply a first output voltage to the transceiver circuit in a Sleep Mode of the buck converter, and to supply a second output voltage to the System Basis Chip of the battery system in a Normal Mode of the buck converter.

According to an embodiment, the method may further include: receiving a second control signal; and operating the buck converter in a third mode upon the reception of the second control signal. In the third mode of operation, the buck converter for a duration (e.g., a predetermined duration) may provide a third output voltage, wherein the third output voltage has a value of $V_3 \in [e; f]$, wherein d<e. In such an embodiment, the buck converter may also be used to provide for a third output voltage, e.g. for a relay driver. Thus, in such an embodiment, a relay driver may be omitted, which may reduce costs, power consumption, and may increase the efficiency of the battery system. The third mode may represent a Relay Close Mode.

According to an embodiment, e=21.5V and f=26.5V. The third output voltage may have a value of $V_3 \in [21.5V; 26.5V]$. Furthermore, the third output voltage may have a value of $V_3 \in [22V; 26V]$. In such an embodiment, the value of the voltage provided with the third output voltage of the buck converter may be sufficient to close a relay used within the battery system.

The first output voltage may have a value of $V_1 \in [7V; 10V]$. Furthermore, the second output voltage may have a value of $V_2 \approx 12V$ (or =12V). Moreover, the third output voltage may have a value of $V_3 \approx 24V$ (or =24V).

The predetermined duration may have a value of $T \in [90$ ms; 110 ms]. For example, the predetermined duration may have a value of T=100 ms. The typical closing time of a relay may be 20 ms. Thus, a sufficient value for the duration T may be $T \in [90$ ms; 110 ms], for example, T=100 ms, which may assure the safe closure of the relay. Further, the predetermined duration may have a value of T=20 ms, 25 ms, 30 ms, 35 ms, 40 ms, 45 ms, 50 ms, 55 ms, 60 ms, 65 ms, 70 ms, 75 ms, 80 ms, 85 ms, 90 ms, 95 ms, 105 ms, 110 ms, 115 ms, 120 ms, 125 ms, 130 ms, 135 ms, 140 ms, 145 ms or 150 ms.

According to an embodiment, the method may further include operating the buck converter in the second mode after the predetermined duration has lapsed. In such an embodiment, the buck converter may fall back into the Normal Mode, providing for a second output voltage of, for example, $V_2$=12V, after the relay has been closed.

According to an embodiment, the first output voltage may be generated via a pulse width modulation and/or may have an alternating value. For example, the first output voltage may alternate between the values of $V_1$=6V and $V_1$=10V. In such an embodiment, the first mode of operation of the buck converter may be a Burst Mode, allowing for reduction of a sleep current, and further increasing the energy efficiency of a battery system. For example, the sleep current may have a value of $I_{sleep}$<25 μA.

According to an embodiment, a battery system may include: a plurality of battery cells and a buck converter. The buck converter may include a first input terminal connected to a first potential provided by the plurality of battery cells, a second input terminal connected to a feedback circuit, and an output terminal to output an output voltage. Moreover, the battery system may include a battery management circuit to be connected to the output terminal via a first switching element (e.g., a first switch), wherein the feedback circuit includes a second switching element (e.g., a second switch) connected in series to a first resistor. The second switching element may electrically connect the second input terminal to a second potential. Furthermore, the feedback circuit may further include a third switching element (e.g., a third switch) connected in series to a second resistor. The third switching element may also electrically connect the second input terminal to the second potential.

In such an embodiment, different voltages may be provided for different components of the battery system, using the single buck converter realized within the battery system. Thus, one or more embodiments of the present invention may allow for a reduction (e.g., a significant reduction) of electronic components. Furthermore, several functionalities may be realized by the one buck converter. For example, the functionalities may include the Power Supply of a System Basis Chip of the battery system, the Power Supply of a Relay Driver of the battery system, including the provision of a Power Safe Mode, and the Power Supply for a Sleep Domain of the electronics of the battery system. The first potential may be the $V_{DD}$ potential provided by the plurality of battery cells. For example, the $V_{DD}$ potential may have a value of 48V. Furthermore, the $V_{DD}$ potential may have a value of $V_{DD} \in [36V; 52V]$. The second potential may be a GND potential.

The buck converter may include components that at least in part are integrated within a System Basis Chip of the battery system. Furthermore, at least some of the components of the buck converter may be realized as an integrated circuit.

The feedback circuit may further include a fourth switching element (e.g., a fourth switch) connected in series to a third resistor, the fourth switching element to electrically connect the second input terminal to the second potential. In this embodiment, more than two different output voltages may be provided by the buck converter.

In an embodiment, the buck converter may further include a third input terminal that is connected to a timer circuit. The timer circuit may be a CMOS timer circuit. The first terminal of a capacitor may be electrically connected to the output terminal of the buck converter, and a second terminal of the capacitor may be electrically connected to the second potential. The timer circuit may allow for the recurring recharge of the capacitor during a Sleep Mode of the buck converter, which is also called a Sleep Mode Refresh. For example, when a recharge is not performed, the first, second, third, and fourth switching elements may be in an opened state.

The timer circuit may alternatingly open and close the second switching element with a predefined frequency, causing the buck converter to provide for an alternating first output voltage. The first output voltage may have a value of $V_1 \in [6V; 10.5V]$. For example, the first output voltage may be a pulse width modulated output voltage. In such an embodiment, a Sleep Mode Refresh may be performed via the closure of the second switching element, providing for a feedback of the buck converter.

In an embodiment, the battery system may further include a transceiver circuit to cause the first, second, and fourth switching elements to be closed upon the reception of a first control signal, thereby causing the buck converter to output a second output voltage of $V_2 \in [10.8V; 13.2V]$. The battery management circuit may be adapted to cause the first, second, and fourth switching elements to be closed upon the reception of a first control signal via the transceiver circuit or via a receiver circuit of the battery system, thereby causing the buck converter to output a second output voltage of $V_2 \in [10.8V; 13.2V]$. In such an embodiment, the buck converter may be transferred from a Sleep Mode into a Normal Mode upon the reception of the first control signal, which represents a wakeup-signal. With such an embodiment, the buck converter may be used to provide for two different output voltages, wherein the higher second output voltage $V_2$ may be outputted when needed or desired. Otherwise, the lower first output voltage $V_1$ may be outputted, which may reduce the power consumption, and thus, may increase the energy efficiency of the battery system.

The battery management circuit may hold the first, second, and fourth switching elements in a closed state when provided with the second output voltage. Furthermore, the battery management circuit may hold the first, second, and fourth switching elements in a closed state as long as it is provided with the second output voltage. In such an embodiment, the Normal Mode may be maintained by the battery management circuit as long as the second output voltage is outputted to the battery management circuit, and as long as no other signal, for example, a timing signal, causes the battery management system to change the state of operation.

In an embodiment, the battery system may further include a fifth switching element (e.g., a fifth switch) electrically connected to the output terminal of the buck converter and to a first terminal of a relay. The relay may include a second terminal that is electrically connected to the second potential of the battery system. In such an embodiment, the relay may be operated using the same buck converter, which may allow for a further reduction of components and power consumption, as a complex relay driver may be omitted.

The transceiver circuit may cause the first, second, third, fourth, and fifth switching elements to be closed for a predetermined duration upon the reception of a second control signal, thereby causing the buck converter to provide the battery management circuit with a third output voltage of $V_3 \in [21.5V; 26.5V]$. Furthermore, the battery management circuit may cause the first, second, third, fourth, and fifth switching elements to be closed for a predetermined duration upon the reception of a second control signal via the transceiver circuit or via a receiver circuit of the battery system, thereby causing the buck converter to provide the battery management circuit with a third output voltage of $V_3 \in [21.5V; 26.5V]$. For example, the predetermined duration may have a value of $T \in [90 \text{ ms}; 110 \text{ ms}]$. For example, when the predetermined duration has a value of T=100 ms, the safe closure of a relay may be assured. More specifically, the predetermined duration may have a value of T=20 ms, 25 ms, 30 ms, 35 ms, 40 ms, 45 ms, 50 ms, 55 ms, 60 ms, 65 ms, 70 ms, 75 ms, 80 ms, 85 ms, 90 ms, 95 ms, 105 ms, 110 ms, 115 ms, 120 ms, 125 ms, 130 ms, 135 ms, 140 ms, 145 ms, or 150 ms.

The buck converter may be operated in the second mode of operation after the predetermined duration has lapsed, providing for the second output voltage.

According to one or more aspects of example embodiments of the present invention, a vehicle including a battery system as defined above may be provided.

Further aspects of example embodiments of the present invention may be learned from practice of embodiments of the present invention, or from the following description.

Figure 1:
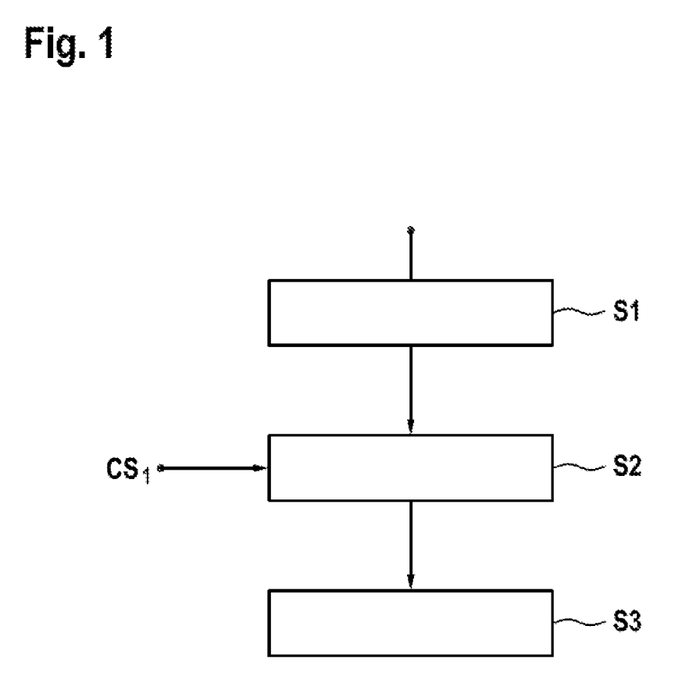
FIG. 1 illustrates a method according to an embodiment of the present invention.

FIG. 1 illustrates a method according to an embodiment of the present invention. The method illustrated in FIG. 1 is a method for the operation of a buck converter as a power source for the electronics of a battery system. The buck converter may be a separate component of the battery system or a component that is integrated within the battery system, for example, a component that is integrated into the System Basis Chip of the battery system.

According to an embodiment of the present invention, the method exemplarily includes three steps. As a first step $S_1$, the buck converter is operated in a first mode in which the buck converter provides for a first output voltage $V_1$. In this example, the first mode is a so called Burst Mode which is a part of a so called Sleep Mode in which large parts (or components) of the battery system's electronics are not active. In this first mode of operation of the buck converter, the first output voltage $V_1$ is provided by the buck converter at the output of the same to power a transceiver circuit, which in this example is included in the electronics of the battery system. In this embodiment, the first voltage $V_1$ exemplarily is an alternating voltage, which in this embodiment alternates between the values of $V_1=6V$ and of $V_1=10V$ to refresh a capacitor that powers a transceiver circuit, for example. However, it may also be possible to realize in other embodiments in which the first output voltage $V_1$ is a constant voltage, having a value of, for example, $V_1=8V$.

The transceiver circuit is also a part (or component) of the battery system's electronics, and may be adapted to receive and transmit signals, for example, control signals. In a second step of this embodiment, a first control signal $CS_1$ is received. In this case, the first control signal $CS_1$ may be a wake up signal, for example, a CAN wakeup signal, or an RTC wakeup signal.

In this embodiment, the transceiver circuit exemplarily receives the first control signal. However, the reception of the control signal may also be performed by any other components of the battery system that is adapted to receive a control signal, for example, by a battery management circuit.

According to a third step $S_3$, the buck converter is operated in a second mode of operation upon the reception of the first control signal $CS_1$. In the second mode, the buck converter provides for a second output voltage $V_2$ for a System Basis Chip of the battery system. In this case, the second mode is a Normal Mode in which large parts (or components) of the battery system's electronics are active. For example, the second output voltage $V_2$ may have a value of $V_2=12V$. However, in other embodiments, other second output voltages $V_2$ may be realized.

Figure 2:
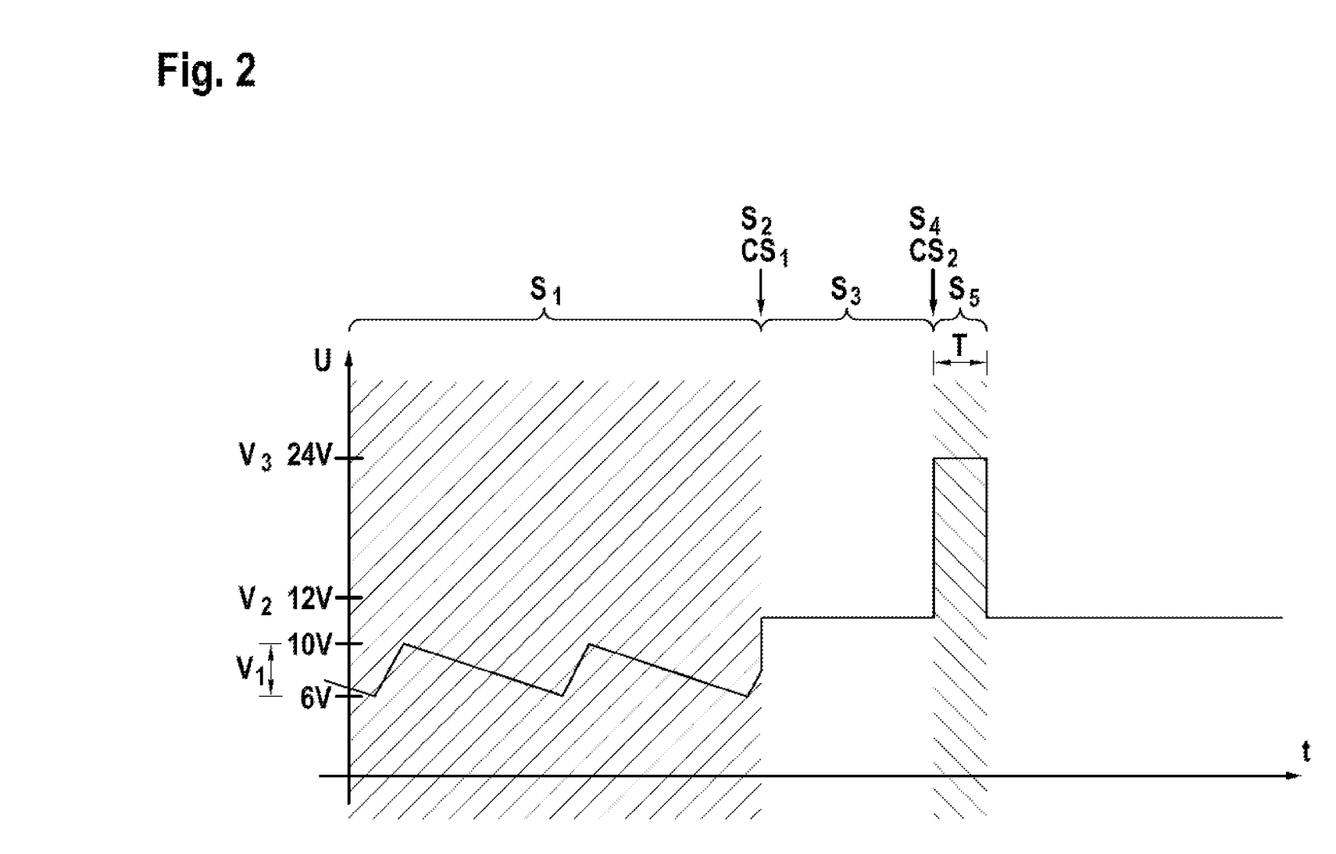
FIG. 2 illustrates a method showing the output voltage of a buck converter used as a power source for the electronics of a battery system, according to an embodiment of the present invention.

FIG. 2 illustrates a method showing the output voltage of a buck converter used as a power source for the electronics of a battery system, according to an embodiment of the present invention. In more detail, FIG. 2 shows a diagram illustrating the output voltage of the buck converter of a battery system, which is operated according to a method according to an embodiment of the present invention. The ordinate of the diagram shows the output voltage of the buck converter, while the abscissa shows the time or duration when a respective output voltage is supplied by the buck converter.

In this embodiment, the first three steps $S_1$ to $S_3$ of the method are the same or substantially the same as the steps as described above in reference to FIG. 1. Thus, in the first step $S_1$, the first output voltage $V_1$ is outputted via the buck converter. The first output voltage may have, for example, a value $V_1$ that is alternating between a value of 6V and 10V over time, forming a saw tooth graph in the diagram shown in FIG. 2. Upon the reception of the first control signal $CS_1$ in the second step $S_2$, the buck converter is operated in a second mode, outputting a second output voltage $V_2$ of exemplarily 12V, which in FIG. 2 is illustrated as a constant line.

In this embodiment, the method further includes the step $S_4$ of receiving a second control signal $CS_2$, and the step $S_5$ of operating the buck converter in a third mode upon the reception of the second control signal $CS_2$. In this case, in the third mode of operation, the buck converter provides for a third output voltage $V_3$ for a duration (e.g., a predetermined duration) T. The second control signal $CS_2$ may be a request for the closure of a relay, and the third mode is a so called Relay Close Mode. The third output voltage $V_3$ exemplarily has a value of $V_3=24V$. Moreover, the duration T exemplarily has a value of T=100 ms.

In FIG. 2, the third mode of operation is illustrated as a voltage pulse of a predefined length, allowing for the closure of a relay. After the pulse, the buck converter is transferred back into a Normal Mode (e.g., the first mode of operation), which is maintained until another control signal is received. Thus, all output voltages $V_1$ to $V_3$ shown in FIG. 2 may be provided using the same buck converter, which supplies different components of the electronics of the battery system with different voltages. However, in other embodiments of the present invention, the voltages $V_1$ to $V_3$ may have values which are different from the values mentioned above, and may also be represented with different graphs U(t) within a diagram.

Expressed in other words, at t=0, the buck converter is in a State Sleep Mode. The Burst Mode shown in step $S_1$ helps to reduce a sleep current. When a wakeup signal is received, for example, a CAN wakeup signal or an RTC wakeup signal, the buck converter goes into a state that represents a Normal Mode at step $S_2$. When there is a request for the closure of a relay, the buck converter goes into a so called Relay Close Mode. The typical closing time is 20 ms, and thus, a sufficient value for the time in this state may be 100 ms. After the relay is closed, the buck converter goes back into the state that represents a Normal Mode, and the relay remains closed. During the Normal Mode and the Relay Close Mode, the System Basis Chip operates. The System Basis Chip may handle the aforementioned voltages, e.g. 12V and 24V, and may not influence other domains (e.g., all other domains) supplied by the System Basis Chip.

Figure 3:
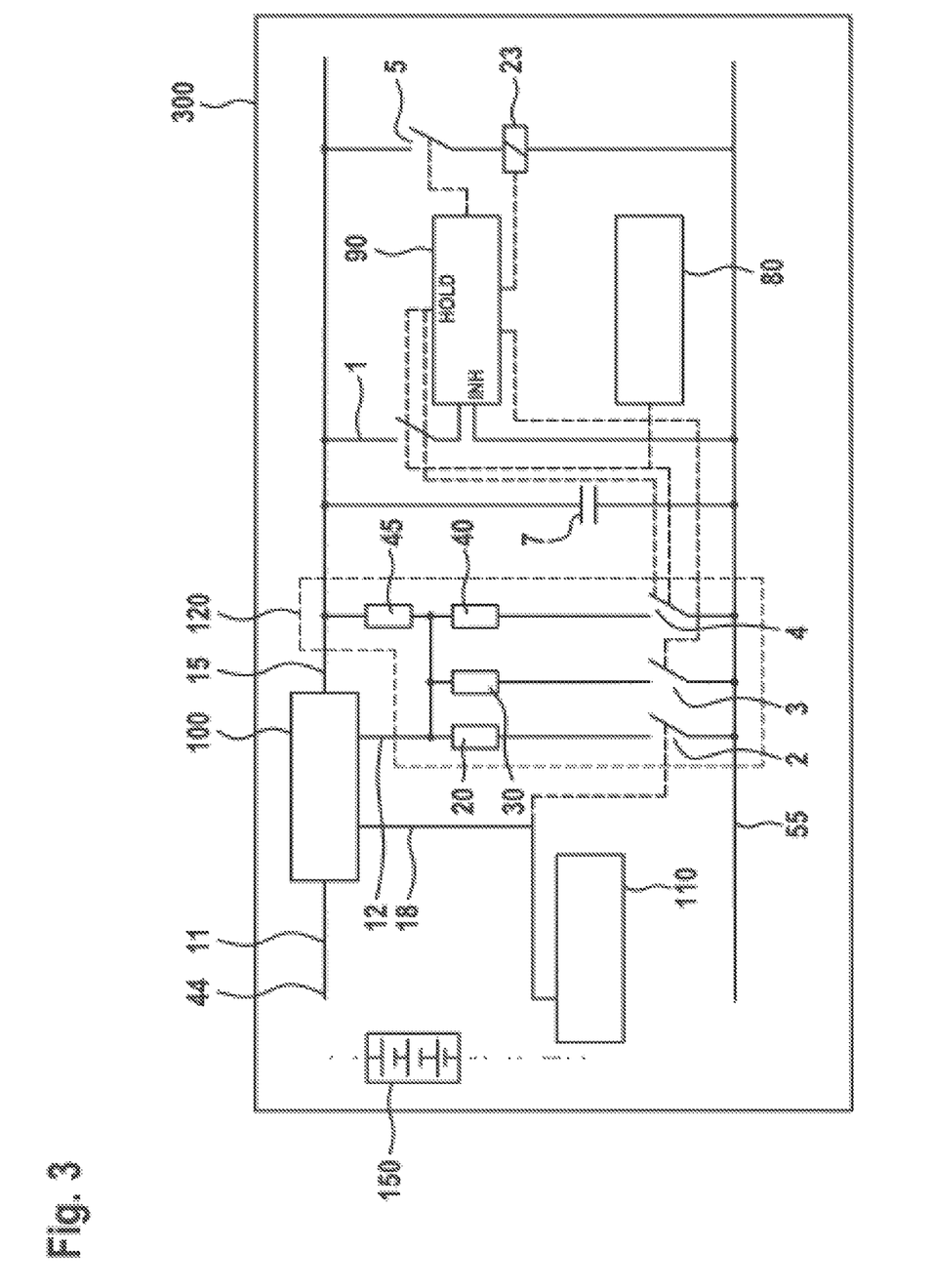
FIG. 3 illustrates a battery system according to an embodiment of the present invention.

FIG. 3 illustrates a battery system 300 according to an embodiment of the present invention.

The battery system 300 includes a plurality of battery cells 150, which are schematically illustrated in FIG. 3. In this embodiment, the battery cells of the plurality of battery cells 150 are connected in series. However, in other embodiments, the battery cells of the plurality of battery cells 150 may be connected in parallel or may be connected in series and in parallel. Moreover, the battery system 300 includes a buck converter 100, which may include a first input terminal 11 connected to a first potential 44 provided by the plurality of battery cells 150. The first potential 44 provided by the plurality of battery cells 150 may be a $V_{DD}$ potential that has a Value in a range (or set) of 36V to 52V (e.g., $V_{DD} \in [36V; 52V]$), for example, $V_{DD}=48V$. However, the plurality of battery cells 150 may also be adapted to provide for a first potential 44 that has a value which differs from the values described above. Furthermore, the battery system 300 includes a second input terminal 12 that is connected to a feedback circuit 120, and an output terminal 15 adapted to output an output voltage. Furthermore, the battery system 300 includes a battery management circuit 90 that is connectable to the output terminal 15 via a first switching element 1. The feedback circuit 120 includes a second switching element 2 connected in series to a first resistor 20, and the second switching element 2 is adapted to electrically connect the second input terminal 12 to a second potential 55. In this embodiment, the second potential 55 exemplarily may be a GND potential.

The feedback circuit 120 further includes a third switching element 3 connected in series to a second resistor 30, and the third switching element 3 is also adapted to electrically connect the second input terminal 12 to the second potential 55. Moreover, the feedback circuit 120 further includes a fourth switching element 4 connected in series to a third resistor 40, and the fourth switching element 4 is also adapted to electrically connect the second input terminal 12 to the second potential 55. Thus, the feedback circuit 120 includes three conductive paths, each including a resistor 20, 30, 40 and a switching element 2, 3, 4. The three conductive paths are connected in parallel to each other. Furthermore, a resistor 45 is connected in series to the aforementioned parallel connections, and the resistor 45 is connected to the output terminal 15 of the buck converter 100.

In this embodiment, the buck converter 100 further includes a third input terminal 18 that is electrically connected to a timer circuit 110. The timer circuit 110 may be exemplarily realized as a CMOS Timer circuit that is adapted to alternatingly open and close the second switching element 2 with a frequency (e.g., a predefined frequency) causing the buck converter 100 to provide for an alternating first output voltage $V_1$. Here, the first output voltage $V_1$ may have a value in a range (or set) of 6V to 10V (e.g., $V_1 \in [6V; 10V]$). However, in other embodiments, the first output voltage $V_1$ may have a value in a range (or set) of 6V to 10.5V (e.g., $V_1 \in [6V; 10.5V]$), when taking into account acceptable tolerances for the output voltage $V_1$. In this embodiment, the battery system 300 further includes a capacitor 7 having a first terminal that is electrically connected to the output terminal 15 of the buck converter 100, and a second terminal of the capacitor 7 is electrically connected to the second potential 55. The timer circuit 110 allows for the recurring recharge of the capacitor 7 during a Sleep Mode of the buck converter 100, which is also referred to as a Sleep Mode Refresh. In more detail, when a recharge is not performed, the first, second, third and fourth switching elements 1, 2, 3, 4 are in an opened state, causing the buck converter 100 to be operated in a Sleep Mode. Thus, in a Sleep Mode of the buck converter 100, all switches are in an open state. During the refresh of the capacitor 7, the second switching element 2 is closed, causing the buck converter 100 to perform a Sleep Mode Refresh. The current is stored within the capacitor 7. Every time after a duration (e.g., a predefined duration), for example, after 1 second, the CMOS Timer circuit—which consumes a current of only some tens of nA during operation—switches on the buck converter 100 for a very short time to recharge the capacitor 7. The voltage at the output 15 of the buck converter 100 may be higher than 5.5V. A sufficient value is between 7V and 10V. In order to activate the buck converter 100, and to perform the aforementioned Sleep Mode Refresh, the second switching element 2 is closed to have a feedback for the buck converter 100.

The battery system 100 further includes a transceiver circuit 80, which in this embodiment may exemplarily be a CAN transceiver circuit. The transceiver circuit 80 may be adapted to cause the first, second, and fourth switching elements 1, 2, 4 to be closed upon the reception of a first control signal $CS_1$, thereby causing the buck converter 100 to output a second output voltage $V_2$ having a value in a range (or set) of 11V to 13 V (e.g., $V_2 \in [11V; 13V]$), for example, $V_2=12V$. However, in other embodiments, the second output voltage $V_2$ may have a value in a range (or set) of 10.8V to 13.2V (e.g., $V_2 \in [10.8V; 13.2V]$), when acceptable tolerances of about +/−10% for the second output voltage $V_2$ are taken into account. The battery management circuit 90 is adapted to hold the first, second, and fourth switching elements 1, 2, 4 in a closed state when provided with the second output voltage $V_2$. Thus, when the CAN transceiver circuit detects a wakeup signal, a pin INH of the CAN transceiver circuit is transferred into a high state, causing the battery management circuit 90 to close the first, second, and fourth switching elements 1, 2, 4, thereby causing the buck converter 100 to output the second output voltage $V_2$ of 12V. When the first, second, and fourth switching elements 1, 2, 4 are closed, the buck converter 100 is operated in a so called Normal Mode. In other embodiments, the transceiver circuit 80 is adapted to directly switch/close the aforementioned switching elements 1, 2, 4. When the first, second, and fourth switching elements 1, 2, 4 are transferred into a closed state, the battery management circuit 90—together with other components of the electronics of the battery system 300—starts to operate. Furthermore, the battery management circuit 90 sets a HOLD output to remain in the Normal Mode.

Moreover, the battery system 300 further includes a fifth switching element 5 electrically connected to the output terminal 15 of the buck converter 100 and to a first terminal of a relay 23. The relay 23 includes a second terminal that is electrically connected to the second potential 55 of the battery system 300. The transceiver circuit 80 is adapted to cause the first, second, third, fourth, and fifth switching elements 1, 2, 3, 4, 5 to be closed for a duration (e.g., a predetermined duration) T upon the reception of a second control signal $CS_2$, thereby causing the buck converter 100 to be operated in a so called Relay Close Mode, and to provide the battery management circuit 90 with a third output voltage $V_3$ having a value in a range (or set) of 22V to 26V (e.g., $V_3 \in [22V; 26V]$), for example, $V_3=24V$. However, in other embodiments, the third output voltage $V_3$ may have a value in the range (or set) of 21.5V to 26.5V (e.g., $V_3 \in [21.5V; 26.5V]$), when acceptable tolerances of about +/−10% for the third output voltage $V_3$ are taken into account.

Thus, if the buck converter 100 is operated in the Normal Mode with the relay 23 being in an opened state and the first, second and fourth switching elements 1, 2, 4 being in a closed state—which is also called "Normal Mode Relay off"—and there is a request to switch on the relay 23, the third and fifth switching elements 3, 5 are additionally switched on, thereby transferring the buck converter 100 into the Relay Close Mode for the aforementioned duration T. This causes the buck converter 100 to have another feedback, which causes the output terminal 15 of the buck converter 100 to rise to 24V. After the duration T—which in this embodiment is equal to some milliseconds—when the relay 23 has been switched on, the third switching element 3 may be switched off again, which causes the output voltage at the output terminal 15 of the buck converter 100 to drop to a voltage of 12V again. Thus, the power consumption of the relay 23 may be decreased due to a lower input (hold) voltage of 12V. This mode of operation of the buck converter 100, in which the first, second, fourth, and fifth switching elements 1, 2, 4, 5 are in a closed state, is also referred to as "Normal Mode Relay on".

In this embodiment, the CMOS timer circuit 80 is used. However, in other embodiments, a window comparator may be used to (alternatingly) switch on or off the buck converter 100.

The different states of the buck converter 100 which depend on the states of the first, second, third, fourth, and fifth switching elements 1, 2, 3, 4, 5 in the aforementioned modes, namely the Sleep Mode (e.g., the first mode of operation), the Sleep Mode Refresh, the Normal Mode (e.g., the second mode of operation), Normal Mode Relay on, Normal Mode Relay off, and Relay Close (e.g., the third mode of operation) may be described in the following table:

| Switch | Sleep Mode | Sleep Mode Refresh | Normal Mode Relay on | Normal Mode Relay off | Relay Close |
|---|---|---|---|---|---|
| 1 | OFF | OFF | ON | ON | ON |
| 2 | OFF | ON | ON | ON | ON |
| 3 | OFF | OFF | OFF | OFF | ON |
| 4 | OFF | OFF | ON | ON | ON |
| 5 | OFF | OFF | ON | OFF | ON |

The electronic or electric devices (e.g., the buck converter, the timer circuit, the battery management circuit, the transceiver circuit, etc.) and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Although the present invention has been described with reference to the example embodiments, those skilled in the art will recognize that various changes and modifications to the described embodiments may be performed, all without departing from the spirit and scope of the present invention. Furthermore, those skilled in the various arts will recognize that the present invention described herein will suggest solutions to other tasks and adaptations for other applications. It is the applicant's intention to cover by the claims herein, all such uses of the present invention, and those changes and modifications which could be made to the example embodiments of the present invention herein chosen for the purpose of disclosure, all without departing from the spirit and scope of the present invention. Thus, the example embodiments of the present invention should be considered in all respects as illustrative and not restrictive, with the spirit and scope of the present invention being indicated by the appended claims, and their equivalents.

What is claimed is:

1. A method for operating a buck converter as a power source for electronics of a battery system, the method comprising:
    operating the buck converter in a first mode in which the buck converter provides a first output voltage by closing a second switch of a feedback circuit;
    receiving a first control signal; and
    in response to receiving the first control signal, operating the buck converter in a second mode in which the buck converter provides a second output voltage for a System Basis Chip of the battery system by closing a fourth switch of the feedback circuit,
    wherein the first output voltage has a first value in a range of a to b, and the second output voltage has a second value in a range of c to d, wherein b is less than c,
    wherein the feedback circuit comprises:
        a first resistor electrically connected between a second input terminal and an output terminal of the buck converter;
        the second switch connected in series to a second resistor, the second switch being configured to electrically connect the second resistor between the second input terminal and a second potential of the battery system; and
        the fourth switch connected in series to a third resistor, the fourth switch being configured to electrically connect the third resistor between the second input terminal and the second potential.

2. The method of claim 1, wherein a=6V, b=10.5V, c=10.8V and d=13.2V.

3. The method of claim 1, further comprising:
    receiving a second control signal; and
    operating the buck converter in a third mode in response to receiving the second control signal by closing a third switch configured to electrically connect a fourth resistor between the second input terminal and the second potential,
    wherein, in the third mode of operation, the buck converter provides a third output voltage for a duration, the third output voltage having a third value in a range of e to f, wherein d is less than e.

4. The method of claim 3, wherein e=21.5V and f=26.5V.

5. The method of claim 4, wherein the duration has a value in a range of 90 ms to 110 ms.

6. The method of claim 3, further comprising:
    operating the buck converter in the second mode after the duration has lapsed.

7. The method of claim 1, wherein the first output voltage is generated via a pulse width modulation and/or has an alternating value by alternatingly opening and closing the second switch.

8. A battery system comprising:
    a plurality of battery cells;
    a buck converter comprising:
        a first input terminal connected to a first potential provided by the plurality of battery cells;
        a second input terminal connected to a feedback circuit; and
        an output terminal configured to output an output voltage; and
    a battery management circuit configured to be connected to the output terminal via a first switch,
    wherein the feedback circuit comprises:
        a first resistor electrically connected between the second input terminal and the output terminal of the buck converter;
        a second switch connected in series to a second resistor, the second switch being configured to electrically connect the second resistor between the second input terminal and a second potential of the battery system; and
        a fourth switch connected in series to a third resistor, the fourth switch being configured to electrically connect the third resistor between the second input terminal and the second potential.

9. The battery system of claim 8, wherein the feedback circuit further comprises a third switch connected in series to a fourth resistor, the third switch being configured to electrically connect the fourth resistor between the second input terminal and the second potential.

10. The battery system of claim 9, further comprising a timer circuit configured to alternatingly open and close the second switch with a frequency, to cause the buck converter to provide an alternating first output voltage.

11. The battery system of claim 10, wherein the first output voltage has a value in a range of 6V to 10.5V.

12. The battery system of claim 9, further comprising a transceiver circuit configured to cause, in response to receiving a first control signal, closing of the first, second, and fourth switches,
wherein the buck converter is configured to output a second output voltage having a range of 10.8V to 13.2V in response to the closing of the first, second, and fourth switches.

13. The battery system of claim 12, wherein the battery management circuit is configured to hold, in response to receiving the second output voltage, the first, second, and fourth switches in a closed state.

14. The battery system of claim 12, further comprising a fifth switch electrically connected to the output terminal of the buck converter, and to a first terminal of a relay, the relay comprising a second terminal electrically connected to the second potential of the battery system.

15. The battery system of claim 14, wherein the transceiver circuit is configured to cause, in response to receiving a second control signal, closing of the first, second, third, fourth, and fifth switches for a duration, and
wherein the buck converter is configured to provide the battery management circuit with a third output voltage having a range of 21.5V to 26.5V in response to the closing of the first, second, third, fourth, and fifth switches.

16. The battery system of claim 11, further comprising a capacitor connected between the output terminal of the buck converter and the second potential,
wherein the timer circuit is configured to allow for a recurring recharge of the capacitor during a sleep mode of the buck converter.

17. The battery system of claim 16, wherein the recurring recharge of the capacitor is performed when the first, third, and fourth switches are opened and the second switch is alternately opened and closed.

* * * * *